Oct. 6, 1936.   A. GOUGE   2,056,667
TUBULAR STRUCTURAL MEMBERS FOR TUBES
Filed Feb. 8, 1936   2 Sheets-Sheet 1
Fig. 1.
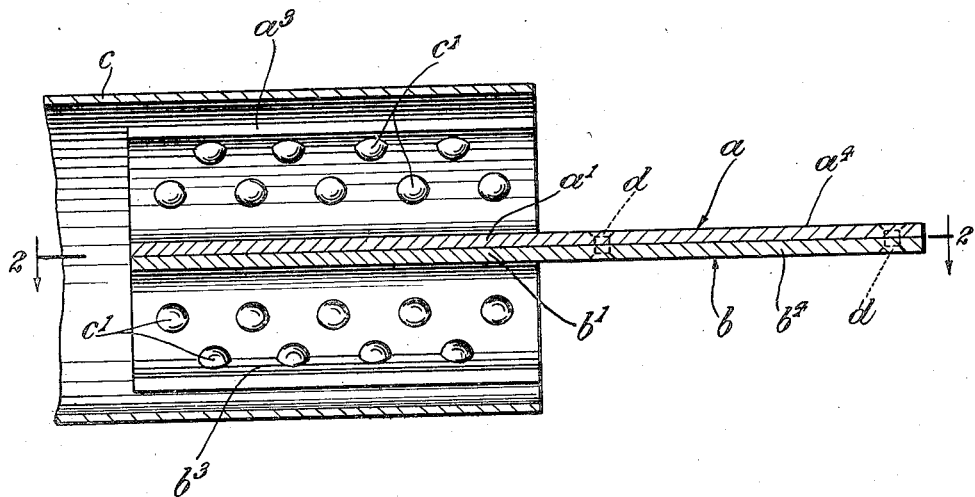
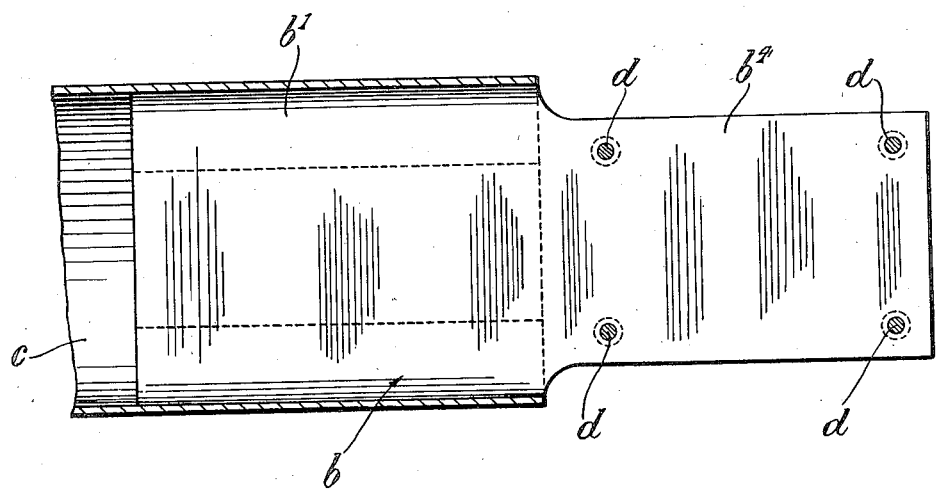
Fig. 2.
Arthur Gouge
Inventor Patented Oct. 6, 1936

2,056,667

UNITED STATES PATENT OFFICE 2,056,667

TUBULAR STRUCTURAL MEMBERS FOR TUBES

Arthur Gouge, Rochester, England, assignor to Short Brothers (Rochester & Bedford) Limited, Rochester, England Application February 8, 1936, Serial No. 62,996
In Great Britain April 11, 1935

2 Claims. (Cl. 189—36)

This invention relates to tubular structural members and it particularly relates to such members when they are connected to the ends of the tubes into which they pass and are riveted through the tube from the interior of the member to the exterior of the tube.

The attachment consists of a central web having flanges at each side which are thinner than the web itself, the relative thickness of the web to the flanges being determined by a consideration of the strength of the tube in which the plug is to be inserted. The flanges extend outwardly in opposite directions somewhat similar to the shape of a letter H and are bent to a radius struck from the neutral axis of the web so as to form an external cylindrical face of a size adapted to rest in close contact with the interior wall of the end of a tube into which the flanged web is inserted. A portion of the web extends in a longitudinal direction beyond the distance of the flanges.

When the attachment is inserted in a tube, holes are drilled through the flanges and through the tube and rivets are passed through these holes and are securely closed so as to firmly connect the flanges to the material forming the tube itself. The web with its flanges forms a plug which is simple in application and attachment and which, when applied to the tube, produces a completed component capable of withstanding compression or tension fully up to the strength of the tube itself. The plug can be manufactured in several ways, such for instance, as being made up of sheets in which the central portions of two flanged members are secured together, the flanges themselves being composed of the out-turned borders of the plate on each side. Alternatively, the plug can be formed from an extruded section, parts of the flanges being cut away in order to leave a suitable tongue for attachment to load bearing members.

Two forms of construction are illustrated by way of example in the accompanying drawings, in which:—

Fig. 1 is a section through the end of a tube, showing also in section a plug according to this invention attached to the tube.

Fig. 2 is a section on the line 2—2 in Fig. 1.

In Figs. 1 to 4 the plug is constructed of two sheets of metal $a$, $a^2$ having their central parts superposed on each other to form webs $a^1$, $b^1$ and having their longitudinal borders out-turned to form flanges $a^2$, $a^3$, $b^2$, $b^3$. These flanges are curved to a radius struck from a centre located on the neutral axis of the web portion so that they fit closely in the end of the tube $c$ to which they are fixed by the rivets $c^1$. In order to form a tongue for attachment to the load bearing members, the flanges are cut away at one end so as to leave web extensions $a^4$, $b^4$ which are fixed to each other by rivets $d$.

Figure 3:
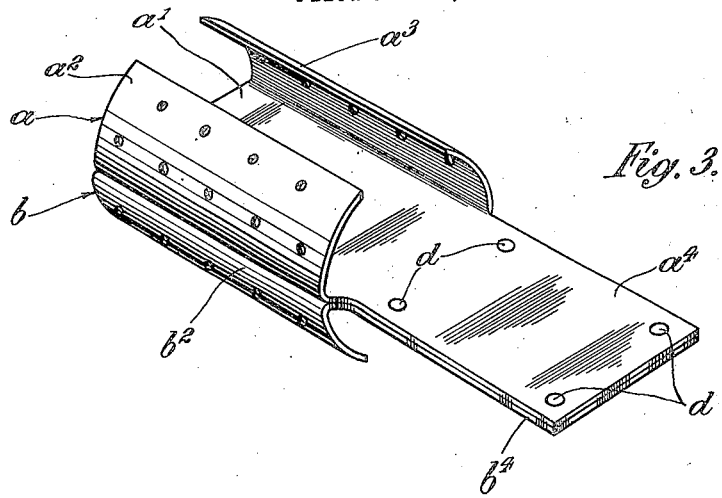
Fig. 3 is a perspective view of the plug detached.
Figure 4:
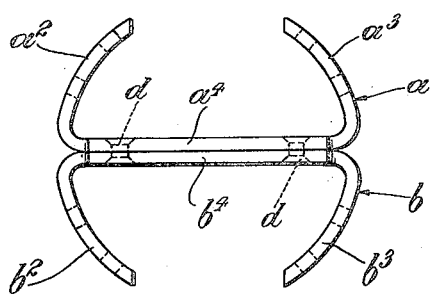
Fig. 4 is an end view of the plug.
Figure 5:
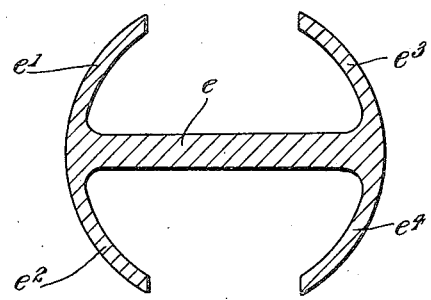
Fig. 5 is a cross-section through an alternative form of plug.

In the alternative form of plug shown in Fig. 5, the whole is extruded with a web $e$, and outwardly directed flanges $e^1$, $e^2$, $e^3$, $e^4$, two at each side of the web. As in the previous construction the flanges are cut away in order to leave a tongue for attachment to load bearing members.

The attachment is suitable for construction in any metal but may be specially applicable for connecting thin steel tubes to connections by means of plugs formed of a lighter but more ductile metal, which owing to its lesser gravity weight can reasonably be formed of greater thickness than if made from thin steel of which the tube is composed.

It will be understood that by machining the plug of a given size, it can be made suitable for a whole range of tubes of the same external diameter but varying in gauge of metal.

What I claim as my invention and desire to secure by Letters Patent is:—

1. In tubular structures, in combination, a tube, an end fitting comprising a central web extending diametrically across the tube, two end flanges on each side of the web which flanges extend in opposite directions to each other and are curved to correspond in shape with and to fit closely in the interior of the tube, and a flat tongue forming an extension of the central web and projecting out of the tube adapted for attachment to other parts of the structure and means for fixing said flanges to the tube.

2. In tubular structures, in combination, a tube, an end fitting constructed of two plate members each consisting of a central web extending diametrically across the tube, an end flange on each side of the web, said flange being curved to correspond in shape with and to fit closely against the interior of the tube and a flat tongue forming an extension of the central web projecting out of the tube and adapted for attachment to other parts of the structure, said plate members being arranged back to back and means for fixing the plate members together and to the tube.

ARTHUR GOUGE.